Patented Feb. 13, 1951

2,541,104

UNITED STATES PATENT OFFICE 2,541,104

17(a)-HYDROXY-20-KETOSTEROIDS AND PROCESS

Lewis Hastings Sarett, Princeton, N. J., assignor to Merck & Co., Inc., Rahway, N. J., a corporation of New Jersey No Drawing. Application September 11, 1947, Serial No. 773,525

8 Claims. (Cl. 260—397.4)

1

This invention is concerned generally with novel steroid compounds and with processes for preparing them. More particularly, it relates to the preparation of 17-(a)-hydroxy-20-keto-pregnane compounds from the corresponding 20-keto pregnane compound and to the intermediate products utilized in preparing the same.

The (a)-hydroxy groupings in the compounds thus obtained, have the same stereochemical configuration as that present in many of the naturally occurring adrenal hormones. This is of special interest in the preparation of pregnene-4-diol-17(a),21-trione-3,11,20 (commonly known as Kendall's compound E), and its 21-acyl derivatives. These compounds are important as adrenal hormones or in therapy requiring adrenal hormone type compounds. They are further useful in the synthesis of similar hormones and compounds.

According to the present invention, 20-keto-pregnane compounds are treated with hydrogen cyanide or one of its salts to produce the corresponding 20-hydroxy-20-cyano-pregnane compound. This product is reacted with a dehydrating agent to produce the corresponding $\Delta^{17}$-20-cyano-pregnene, which is then reacted with an oxidizing agent and the intermediate product hydrolyzed to produce the corresponding 17(a)-hydroxy-20-keto-pregnane compound. The 17-hydroxy group, introduced according to this novel method, is obtained, surprisingly enough, in only one isomeric form, namely the a or "natural" configuration.

These reactions may be chemically represented in the case of 20-keto-pregnane as follows:

2

For purposes of this application the configuration represented by the notation 17(a)-hydroxy is to be understood to represent the configuration present in the naturally occurring adrenal compounds.

The preferred class of starting materials utilized in practicing the present invention are 20-keto-pregnanes which contain free or esterified hydroxyl groupings in the molecule, and which may also contain keto groupings. These preferred starting materials may be represented by the following generic formula:

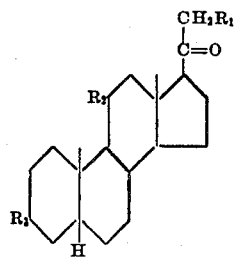

wherein $R_1$ and $R_3$ are radicals selected from the class which consists of hydroxy radicals, acyloxy radicals and hydrogen and $R_2$ is a radical selected from the class which consists of keto radicals and hydrogen.

Examples of this preferred class of starting materials are: 3(a)-hydroxy-11,20-diketo-pregnane, 3-acetoxy-11,20-diketo-pregnane, 3-benzoxy-11,20-diketo-pregnane, 3(a)-hydroxy-11,20-diketo-21-hydroxy-pregnane, 3(a)-hydroxy-11,20-diketo-21-acetoxy-pregnane, and the like.

In carrying out my improved process, I ordi-

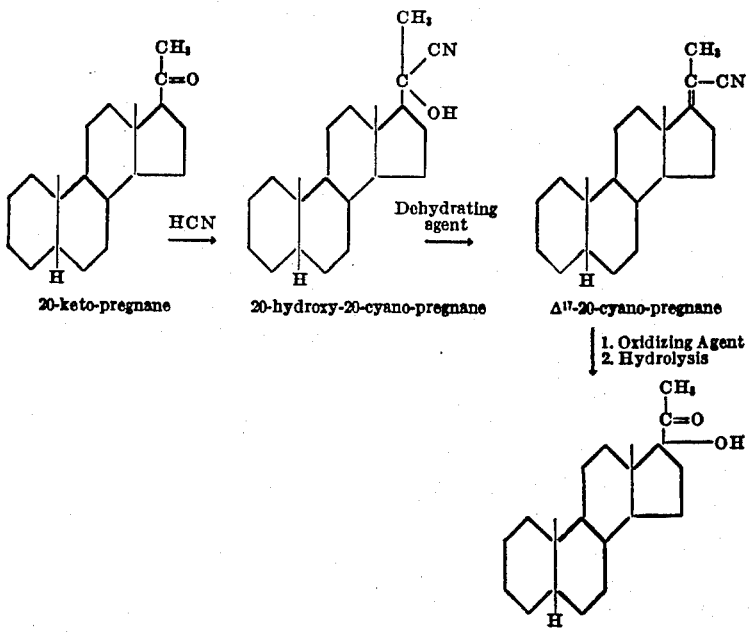

narily react a starting material of the above class with hydrogen cyanide, or one of its salts, preferably in solution in a lower aliphatic alcohol. When the resulting C-20 cyanhydrin contains free primary or secondary hydroxyl groupings, these may be protected, prior to the dehydration reaction, by conversion to the corresponding acyloxy radicals. This is accomplished by reacting said cyanhydrin with an acylating agent, such as a lower aliphatic acid anhydride. Alternatively, a secondary hydroxyl group may be protected by oxidation to a ketone, since the C-20 cyanhydrin grouping is stable to this treatment. It is ordinarily preferred to conduct this oxidation reaction utilizing chromic acid as the oxidizing agent.

The dehydration reaction is best carried out by treating the cyanhydrin, after acylation or oxidation of any free hydroxyl groupings which may be present, with a dehydrating agent, such as phosphorus oxychloride. This reaction is ordinarily carried out in solution in a substantially anhydrous organic solvent, such as pyridine.

The hydroxylation of the resulting $\Delta^{17}$-20-cyano-pregnene compound is ordinarily carried out by treatment with osmium tetroxide, although other oxidizing agents, such as aqueous potassium permanganate, hydrogen peroxide in conjunction with a catalytic amount of osmium tetroxide, and the like, may be employed, if desired. When osmium tetroxide is employed, the intermediate osmate ester is conveniently hydrolyzed by treatment with an aqueous solution of sodium sulfite. Under these conditions, the intermediate 17,20-dihydroxy-20-cyano-pregnane compound is not stable and proceeds, with loss of hydrogen cyanide, to the corresponding 17($\alpha$)-hydroxy-20-keto-pregnane derivative.

A preferred feature of my invention is that 17($\alpha$)-hydroxy-3,20-diketo-pregnane compounds (after acylation or oxidation of any auxiliary hydroxyl groupings) can be brominated, and the resulting 4-bromo derivative refluxed with pyridine to produce the corresponding $\Delta^4$-17($\alpha$)-hydroxy-3,20-diketo pregnene. It is surprising that the 17-hydroxy-20-keto side chain, which is known to be very sensitive to rearrangement in the presence of acids or bases, is stable to the two reactions just described.

The following examples illustrate methods of carrying out the present invention, but it is to be understood that these examples are given by way of illustration and not of limitation.

*Example 1*

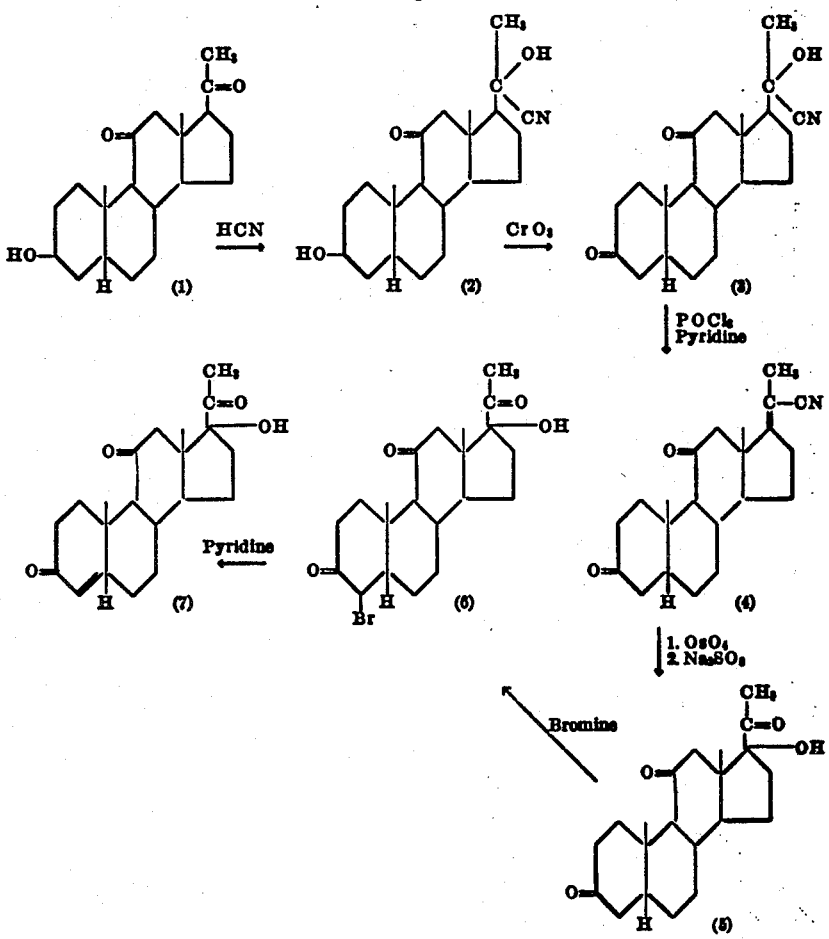

A solution of 1.80 g. of 3($\alpha$)-hydroxy-11,20-diketo-pregnane (compound 1, above), which can be prepared as described by von Euw, Lardon and Reichstein in Helv. Chim. Acta 27, 821 (1944), in a mixture of 25 cc. of alcohol and 6.4 cc. of acetic acid at 0° C. is treated with 6.0 g. of potassium cyanide. The solution is allowed to warm to room temperature and after three hours is diluted with water and filtered. The wet crude cyanhydrin is dissolved in ethyl acetate and the extract washed with water. Crystallization then gives approximately 1.5 g. of 3($\alpha$),20-dihydroxy-20-cyano-11-keto-pregnane (compound 2).

To a solution of 1.4 g. of 3($\alpha$),20-dihydroxy-20-cyano-11-keto-pregnane in 70 cc. of acetic acid is added at 16° C. a solution of 0.9 g. of chromic acid in 7 cc. of acetic acid. At the end of one hour, water is added, the crystalline precipitate filtered and recrystallized from ethyl acetate to produce approximately 0.93 g. of 3,11-diketo-20-hydroxy-20-cyano-pregnane(compound 3), dec. 170–180° C.

About 0.60 cc. of phosphorus oxychloride is added to a solution containing 2.0 g. of 3,11-diketo-20-hydroxy-20-cyano pregnane dissolved in 6.7 cc. of pyridine. After standing at room temperature for 24 hours, the solution is poured into water and dilute hydrochloric acid, extracted with benzene and concentrated to dryness. The crystalline residue consists of nitriles which may be separated chromatographically to produce approximately 300 mg. of $\Delta^{17}$-3,11-diketo-20-cyano-pregnene (compound 4); M. P. 222–230° C.

200 mg. of osmium tetroxide and 96 mg. of pyridine are added to a solution containing about 196 mg. of $\Delta^{17}$-3,11-diketo-20-cyano-pregnene (M. P. 222–230° C.) dissolved in 2 cc. of benzene. This solution is allowed to stand at room temperature for approximately 19 hours and then diluted with about 10 cc. of alcohol. A solution of 500 mg. of sodium sulfite in 10 cc. of water is added and the resulting mixture is stirred for approximately 15 hours. Most of the alcohol is then evaporated under reduced pressure and the residue is extracted with benzene. The benzene extract is then washed with water and evaporated to dryness. Addition of ether gives crystalline 3,11,20 - triketo - 17($\alpha$) - hydroxy-pregnane (compound 5); M. P. 198–199° C.

About 41 mg. of bromine is added to a solution of 86 mg. of 3,11,20-triketo-17($\alpha$)-hydroxy-pregnane in 1.0 cc. of acetic acid. When the reaction is substantially complete, the solution is immediately poured into water, and the resulting suspension extracted with chloroform. The chloroform extract is washed with water, evaporated to dryness and the residual material crystallized from acetone ether to produce 4-bromo-3,11,20-triketo-17($\alpha$)-hydroxy - pregnane (compound 6).

A solution containing about 71 mg. of 4-bromo-3,11,20-triketo - 17($\alpha$) - hydroxy - pregnane dissolved in 5 cc. of pyridine is heated under reflux for approximately 5 hours. The pyridine is then evaporated under reduced pressure, the residue is dissolved in ether, and the ether extract is washed with dilute aqueous hydrochloric acid, then with water and is finally concentrated to small volume. The product, which separates, is recrystallized several times from methanol to produce substantially pure $\Delta^{4}$-3,11,20-triketo-17($\alpha$)-hydroxy-pregnene (compound 7); M. P. 230–233° C.

*Example 2*

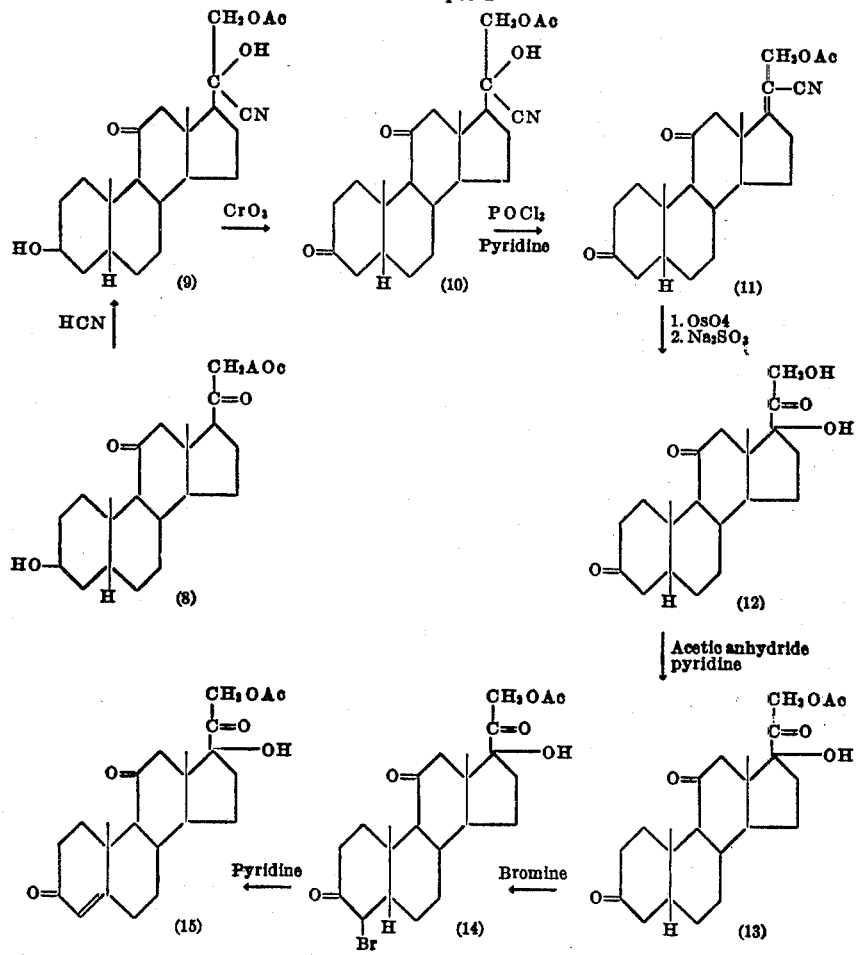

A solution of 2.0 g. of 3($\alpha$)-hydroxy-21-acetoxy-11,20-diketo-pregnane (compound 8), which can be prepared as described by von Euw, Lardon and Reichstein, Helv. Chim. Acta 27, 1287 (1944), is treated in a mixture of 25 cc. of alcohol and 6.4 cc. of acetic acid at 0° C. with 6.0 g. of potassium cyanide. The solution is allowed to warm to room temperature and after 3 hours is diluted with water. The addition of a large volume of water to the alcohol-hydrogen cyanide mixture precipitates a gum which is extracted with chloroform or ethyl acetate. The extract is washed with water, and evaporated to small volume under reduced pressure. The crystalline precipitate (1.3 g.) consists of 3(a),20-dihydroxy-20-cyano-21-acetoxy-11-keto-pregnane (compound 9); dec. 175–185° C.

A solution of 0.60 g. of chromic acid in 1.2 cc. of water and 11 cc. of acetic acid is added to a solution containing about 1.2 g. of 3(a),20-dihydroxy - 20 - cyano-21-acetoxy-11-keto-pregnane at room temperature. After 1 hour, water is added and the product, which precipitates, is filtered and recrystallized from ethyl acetate to produce 3,11-diketo - 20 - hydroxy-20-cyano-21-acetoxy-pregnane (compound 10); dec. 214–217° C.

0.40 cc. of phosphorus oxychloride is added to a solution containing about 950 mg. of 3,11-diketo-20-hydroxy - 20 - cyano-21-acetoxy-pregnane dissolved in 3 cc. of pyridine. After standing at room temperature for 24 hours, the solution is poured into water and dilute hydrochloric acid, extracted with benzene and concentrated to dryness. The crude product, after chromatography gives one main constituent, namely $\Delta^{17}$-3,11-diketo-20-cyano-21-acetoxy-pregnene (compound 11); M. P. 189–190° C.

A solution of 1.0 g. of $\Delta^{17}$-3,11-diketo-20-cyano-21-acetoxy-pregnene in 10 cc. of benzene is treated with 1.0 g. of osmium tetroxide and 0.43 g. of pyridine. After standing at room temperature for 18 hours, the resulting solution is treated successively with 50 cc. of alcohol, and with 50 cc. of water containing 2.5 g. of sodium sulfite. The mixture is stirred for 30 hours, filtered, and the filtrate acidified with 0.5 cc. of acetic acid and concentrated to small volume in vacuo. The aqueous suspension is then extracted four times with chloroform, the chloroform extracts are combined, washed with water and concentrated to dryness in vacuo. Recrystallization of the residue from acetone gives 3,11,20-triketo-17(a) - 21-dihydroxy-pregnane (compound 12); M. P. 227–229° C.

This compound is then treated with acetic anhydride and pyridine for 15 minutes at room temperature to produce 3,11,20-triketo-17(a)-hydroxy - 21 - acetoxy - pregnane (compound 13); M. P. 222–224° C.

A solution containing 132 mg. of bromine in 1.0 cc. of acetic acid is added to a solution containing 333 mg. of 3,11,20-triketo-17(a)-hydroxy-21-acetoxy-pregnane dissolved in 5.0 cc. of acetic acid. When the reaction is substantially complete, the solution is immediately poured into water, and the resulting suspension extracted with chloroform. The chloroform extract is washed with water, evaporated to dryness, and the residual material crystallized from acetone-ether to produce 4-bromo-3,11,20-triketo-17(a)-hydroxy-21-acetoxy-pregnane (compound 14); dec. 190° C.

A solution of 300 mg. of 4-bromo-3,11,20-triketo-17(a)-hydroxy-21-acetoxy - pregnane in 12 cc. of pyridine is heated for 5 hours under reflux. The pyridine is evaporated in vacuo, the residue is dissolved in chloroform, and the chloroform extract is washed with dilute aqueous hydrochloric acid and with water. The chloroform is evaporated under reduced pressure, and the residual material recrystallized several times from alcohol to produce substantially pure $\Delta^4$-3,11,20 - triketo-17(a)-hydroxy-21-acetoxy-pregnene (compound 15); M. P. 236–238° C. (This compound is otherwise designated as Kendall's compound E acetate.)

*Example 3*

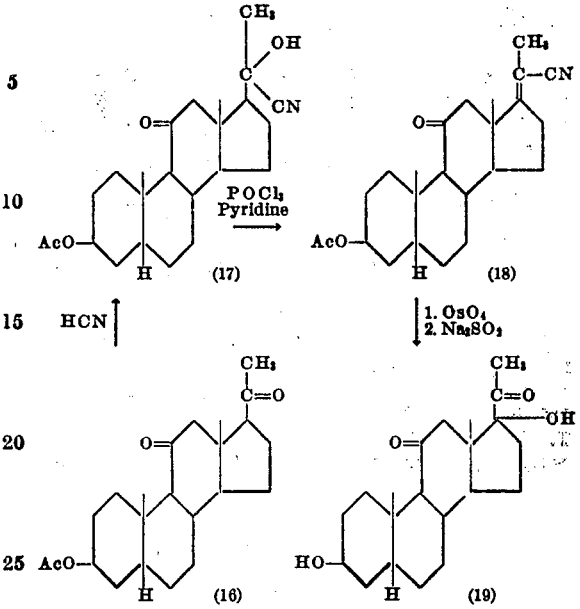

About 1.70 g. of 3(a)-acetoxy-11,20-diketo-pregnane (compound 16, above) which can be prepared as shown by von Euw, Lardon and Reichstein in Helv. Chim. Acta 27, 821 (1944), is dissolved in a mixture of 25 cc. of alcohol and 6.4 cc. of acetic acid and the solution is treated at 0° C. with 6.0 g. of potassium cyanide. The solution is allowed to warm to room temperature and after three hours is diluted with water and the material which precipitates recovered by filtration. The 3(a)-acetoxy-20-hydroxy-20-cyano-11-keto-pregnane (compound 17), thus obtained, may be purified by recrystallization from ethyl acetate. It decomposes at about 221–223° C. Yield approximately 90% of theory.

To a solution of 293 mg. of 3(a)-acetoxy-20-hydroxy-20-cyano-11-ketopregnane in 1.0 cc. of dry pyridine is added 0.10 cc. of phosphorus oxychloride. After standing at room temperature for 24 hours, the solution is poured into water, and dilute hydrochloric acid, extracted with benzene and the benzene extract concentrated to dryness. The crystalline residue consists of a mixture of unsaturated nitriles which may be separated chromatographically to produce $\Delta^{17}$-3(a)-acetoxy-11-keto-20 - cyano - pregnene, (compound 18); M. P. 194–195° C.

About 1.70 g. of osmium tetroxide and 0.5 cc. of pyridine are added to a solution containing about 1.65 g. of $\Delta^{17}$-3(a)-acetoxy-11-keto-20-cyano-pregnene dissolved in 16 cc. of benzene. This solution is allowed to stand at room temperature for approximately 20 hours and then diluted with about 50 cc. of alcohol. A solution of 3.0 g. of sodium sulfite in 50 cc. of water is added, and the resulting mixture is stirred for approximately 15 hours. Most of the alcohol is then evaporated under reduced pressure and the residual product is extracted with benzene. The benzene extract is washed with water and evaporated to dryness. Addition of ether gives approximately 800 mg. of crystalline 3(a),17(a)-dihydroxy-11,20 - diketo - pregnane (compound 19); M. P. 201–202° C.

I claim:

1. The process which comprises reacting a 17(a)-hydroxy-3,20-diketo-pregnane compound with bromine and heating the resulting 4-bromoderivative with pyridine to produce the corresponding $\Delta^4$-17($\alpha$) - hydroxy - 3,20 - diketo-pregnene compound.

2. The process which comprises reacting bromine with a compound of the formula:

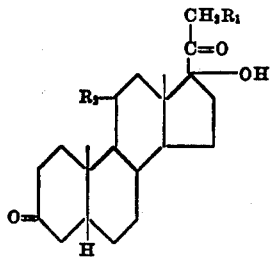

wherein $R_1$ is a radical selected from the class which consists of lower aliphatic carboxylic acyloxy radicals and hydrogen, and $R_2$ is a keto radical, and heating the resulting 4-bromo-derivative with pyridine to produce a compound having the formula:

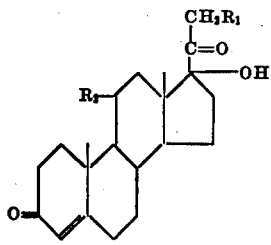

wherein $R_1$ and $R_2$ have the significance above-defined.

3. The process which comprises reacting 3,11,20 - triketo - 17($\alpha$) - hydroxy-pregnane with bromine in acetic acid, and heating the resulting 4-bromo-derivative with pyridine to produce $\Delta^4$-17($\alpha$)-hydroxy-3,11,20-triketo-pregnene.

4. The process which comprises reacting 3,11,20 - triketo - 17($\alpha$) - hydroxy - 21-acetoxy-pregnane with bromine in acetic acid, and heating the resulting 4-bromo-derivative with pyridine to produce $\Delta^4$-17($\alpha$)-hydroxy-3,11,20-triketo-21-acetoxy-pregnene.

5. 17($\alpha$) - hydroxy-3,20-diketo-pregnane compounds having a bromo substituent attached to the 4-position of the perhydrophenanthrene nucleus.

6. Compounds having the formula:

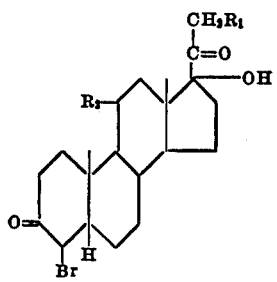

wherein $R_1$ is a radical selected from the class which consists of lower aliphatic carboxylic acyloxy radicals and hydrogen, and $R_2$ is a keto radical.

7. 4 - bromo - 3,11,20 - triketo-17($\alpha$)-hydroxy pregnane.

8. 4 - bromo - 3,11,20 - triketo-17($\alpha$)-hydroxy-21-acetoxy-pregnane.

LEWIS HASTINGS SARETT.

REFERENCES CITED

The following references are of record in the file of this patent:

UNITED STATES PATENTS

| Number | Name | Date |
| --- | --- | --- |
| 2,232,730 | Reichstein | Feb. 25, 1941 |
| 2,256,500 | Serini | Sept. 23, 1941 |
| 2,280,828 | Inhoffen | Apr. 28, 1942 |
| 2,403,683 | Reichstein | July 9, 1946 |

OTHER REFERENCES

Mason and Kendall, Jour. Biol. Chem. 114, pp. 626–627 (1936).

Kendall, Jour. Biol. Chem. 114, p. LVII (1936).

Euw et al., Helv. Chim. Acta 25, pp. 988–1022 (1942).